W. W. BURNWATT AND G. W. HAUSCHILD.
GARDEN HOSE HOLDER.
APPLICATION FILED OCT. 13, 1917.
1,337,541.
Patented Apr. 20, 1920.
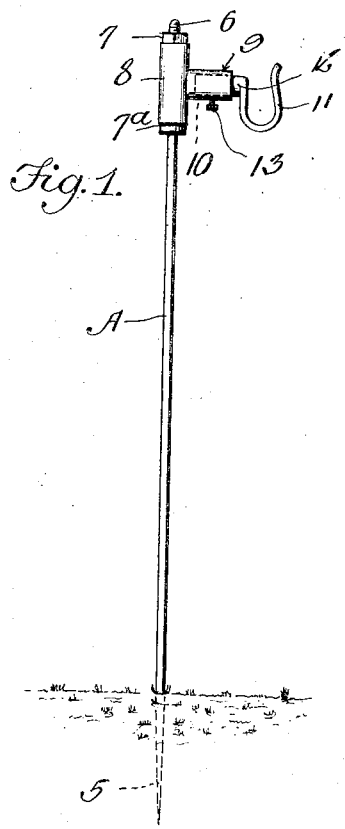
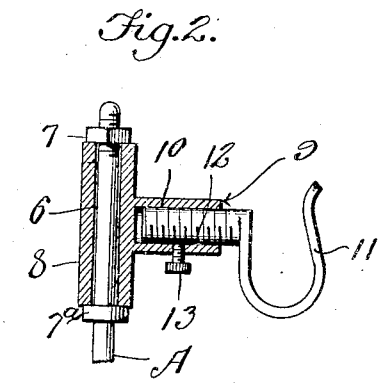
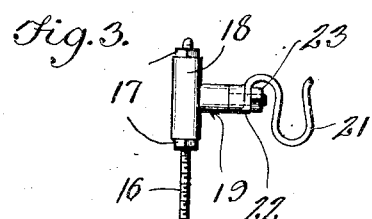
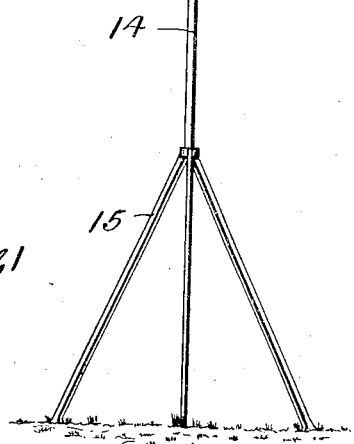
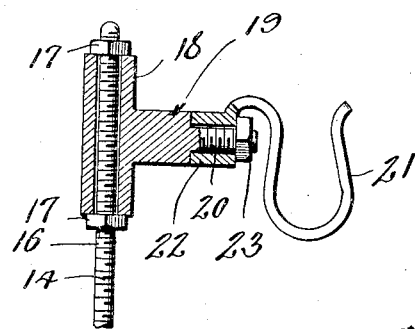

UNITED STATES PATENT OFFICE.

WILLIAM W. BURNWATT AND GEORGE W. HAUSCHILD, OF LOS ANGELES, CALIFORNIA.

GARDEN-HOSE HOLDER.

1,337,541.   Specification of Letters Patent.   Patented Apr. 20, 1920.

Application filed October 13, 1917. Serial No. 196,422.

*To all whom it may concern:*

Be it known that WILLIAM W. BURNWATT and GEORGE W. HAUSCHILD, citizens of the United States of America, residing at Los Angeles, in the county of Los Angeles and State of California, have invented a new and useful Garden-Hose Holder, of which the following is a specification.

The invention relates to a garden hose holder, and more particularly to the class of adjustable hose holders.

The primary object of the invention is the provision of a holder of this character, wherein the upright or staff can be conveniently anchored in the ground, and the nozzle of the hose secured in the required position for the watering of the lawn or the like, thereby eliminating the necessity of holding the hose in the hand as usual.

Another object of the invention is the provision of a hose holder of this character, wherein the clamp for the nozzle of the hose can be readily and easily adjusted to suit the fancy of the user, and the height of the nozzle from the ground regulated as the occasion may require.

A further object of the invention is the provision of a holder of this character, which is extremely simple in construction, thoroughly reliable and efficient in its purpose, strong, durable, readily portable, when not in use will occupy the least possible space, and also which is inexpensive in manufacture.

With these and other objects in view, the invention consists in the features of construction, combination and arrangement of parts as will be hereinafter fully described, illustrated in the accompanying drawing, and pointed out in the claim hereunto appended.

In the accompanying drawing:—

Figure 1, is an elevation of a hose holder constructed in accordance with the invention.

Fig. 2, is a fragmentary vertical sectional elevation.

Fig. 3 is a view similar to Fig. 1, showing a slight modification of the invention.

Fig. 4, is a fragmentary sectional view thereof.

Similar reference characters indicate corresponding parts throughout the several views in the drawing.

Referring to the drawing, in detail, particularly Figs. 1 and 2, the garden hose holder comprises an upright or staff A, preferably in the form of a rigid rod, having a pointed end 5, which is adapted to be driven into the ground or other foundation for the anchoring of the upright or staff therein. The opposite end portion of the upright or staff A, is formed with a screw thread 6, for adjustably receiving a cap or nut 7, while below the thread 6, is a permanent shoulder 7ª, and engaged on said threaded end between the nut 7, and said shoulder 7ª, is the sleeve 8, of a substantially T-shaped member forming a bracket 9, the stem of which is formed with a threaded socket 10, for the adjustable mounting of a clamp upon the member in a manner presently described.

The clamp comprises a resilient hook 11, in which is adapted to be engaged the nozzle of the garden hose, and this hook 11, is formed with a threaded shank 12, which is threaded within the socket 10, the shank being rotatable therein, and is secured in adjusted position by means of a set screw 13, threaded in the stem to engage with the shank of said hook 11, as is clearly shown in Fig. 2 of the drawing.

The member constituting the bracket 9, is swingingly adjustable on the upright or staff A, by turning the nut 7, on the threaded end 6, thereof, and when the bracket 9, is at the proper point of adjustment upon the upright or staff the cap or nut 7, is tightened against the sleeve 8, to hold said bracket secure.

In Figs. 3 and 4, of the drawing there is shown a slight modification of the invention, wherein the upright or staff 14, is formed with tripod legs 15, which are driven into the ground or other foundation, thereby holding the said staff or upright 14, more firmly in vertical position.

The upper end portion of the upright or staff 14, is formed with a screw thread 16, for adjustably receiving the nuts 17, while surrounding this threaded end is the sleeve 18, of a substantially T-shaped member forming a bracket 19, the stem of which is provided with a reduced threaded end 20, for the adjustable mounting of a clamp thereon, hereinafter fully described.

The clamp comprises a resilient hook 21, for the engagement of the nozzle of the garden hose therein, and this hook is formed with a collar terminal 22, which is engaged on the reduced end 20, the latter being fitted with a nut 23, which secures the collar terminal 22, thereon. It will be obvious that the hook 21, can be adjusted to suit the user of the hose so that its nozzle can be positioned angularly as the occasion may require.

The member constituting the bracket 19, can be readily adjusted vertically on the upright or staff 14, to properly elevate the nozzle, as may be desired.

From the foregoing it is thought that the construction and manner of use of the holders will be clearly understood, and therefore a more extended explanation has been omitted. However, it is to be understood that changes, variations and modifications may be made in the invention, such as come properly within the scope of the appended claim, without departing from the spirit of the invention or sacrificing any of its advantages.

What is claimed is:

A hose holder comprising a supporting staff, a bracket carried thereby, a stem projecting from said bracket, said stem including a reduced threaded end, said reduced end forming with the stem a shoulder, a hose clamp including a hook and collar, said collar being engaged with the threaded end of the stem and having one end thereof abutting said shoulder, and a nut threaded on said reduced end of the stem and acting to force the collar into binding engagement with the shoulder.

In testimony that we claim the foregoing as our own, we have hereto affixed our signatures in the presence of witnesses.

WILLIAM W. BURNWATT.
GEORGE W. HAUSCHILD.

Witnesses:
W. R. QUINLAN,
ROBT. S. THACKER.